United States Patent [19]

Seya et al.

[11] Patent Number: 5,619,295
[45] Date of Patent: Apr. 8, 1997

[54] CAMERA COVER FOR TAKING A SELF-PORTRAIT AND A METHOD OF MAKING THE SAME

[75] Inventors: Tadayoshi Seya, Tokyo; Mamoru Sato, Matudo, both of Japan

[73] Assignee: Sanyo Harz Co., Tokyo, Japan

[21] Appl. No.: 555,327

[22] Filed: Nov. 8, 1995

[51] Int. Cl.⁶ .................................................. G03B 13/02
[52] U.S. Cl. ........................ 396/376; 396/502; 396/535
[58] Field of Search ............................. 354/220, 266, 354/288, 269

[56] References Cited

U.S. PATENT DOCUMENTS

| | | | |
|---|---|---|---|
| 1,992,068 | 2/1935 | Gwozdecki | 354/220 |
| 4,560,261 | 12/1985 | Ueda et al. | 354/220 |
| 4,771,300 | 9/1988 | Bryan | 354/220 |
| 4,999,657 | 3/1991 | Leuer | 354/220 |
| 5,126,772 | 6/1992 | Albrecht | 354/266 |
| 5,361,172 | 11/1994 | Schissel et al. | 359/883 |
| 5,471,272 | 11/1995 | Bucolo | 354/269 |

*Primary Examiner*—Safet Metjahic
*Assistant Examiner*—Eddie C. Lee
*Attorney, Agent, or Firm*—Armstrong, Westerman, Hattori, McLeland and Naughton

[57] ABSTRACT

By attaching a camera cover to an existing camera, user can take a photograph of himself or herself with an intended camera angle, scope and timing. A camera cover body, which comprises the camera cover to be removably attached to a camera, has a front portion covering a front side of the camera. The front portion is formed in a shape of a convex spherical surface and has an aperture in a position corresponding to a lens of the camera. A reflecting layer is formed on an inside of the front portion by aluminum evaporation, etc. The whole part of the front portion structures a convex mirror.

3 Claims, 5 Drawing Sheets

CAMERA COVER FOR TAKING A SELF-PORTRAIT AND A METHOD OF MAKING THE SAME

BACKGROUND OF THE INVENTION

The present invention relates to a camera cover for taking a self-portrait and a method of making the same, wherein the camera cover enables user to take a self-portrait by attaching the cover to an existing camera.

Recently, a film-installed miniature camera, so-called disposal camera or a film with lenses, has been widely used because of its light-weight, compactness, portability, low-cost, etc., and thus everyone can easily enjoy taking a picture irrespective of age or gender.

Under such circumstance, it has been desired that user can take a photograph of himself or herself, rather than having a picture taken by others, by operating a camera, while watching his or her look or pose. There has also been such a demand to take an enjoyable picture to the memory of a party or the like with a desired arrangement, or a picture with a certain person without any assist of others.

In these cases, user sets a camera having a self-timer on a tripod or a desk, etc., focuses the camera on a hypothetical subject while looking through a viewfinder by imagining the position of the subject and decides a scope of picture by moving the camera back and forth. Thereafter, user sets a self-timer and then moves to the position to be taken a picture.

The above mentioned conventional way of taking a picture is based on a hypothetical position and a scope of picture. Therefore, there has been problems as follows. It is hard to take a picture as intended. It is hard to click the shutter when the photographer is satisfied. It takes a time to position and forcus the camera. Further, conventionally, a camera, which can take a self-portrait as a subject, has not been provided.

In view of the foregoing unsolved problems, the present invention aims at providing a camera cover for taking a self-portrait which enables user to take a picture of himself or herself with an intended camera angle, scope of picture and timing only by attaching the cover to an existing camera. The present invention also aims at providing a method of making the camera cover.

SUMMARY OF THE INVENTION

In order to attain the above-mentioned purposes, there is provided a camera cover to be removably attached to a camera, comprising a front portion covering at least a front side of a camera, the front portion being formed in a shape of a convex spherical surface and having an apperture in a position corresponding to a lens of the camera, wherein a whole surface of the front portion structures a convex mirror.

A shutter release means for remote control of a shutter of the camera may preferably be equipped with the camera cover.

Further, a method of making a camera cover according to the present invention comprising the steps of:

preparing a camera cover body to be removably attached to a camera, the cover body having a front portion which covers at least a front side of a camera, the front portion being formed in a shape of a convex spherical surface and having an apperture in a position corresponding to a lens of the camera;

preparing a mirror sheet comprising a transparent film, a reflecting layer formed on a back surface of the transparent film by evaporation, an adhesive layer formed on the reflecting layer and a protective film formed on a front surface of the transparent film;

cutting out the mirror sheet into a shape of the front portion; and affixing the cutout mirror sheet on the front portion by the adhesive layer.

DETAILED DESCRIPTION OF THE PREFERRED EMBODIMENT

Preferred embodiments will now be described with reference to the drawings.

Figure 1:
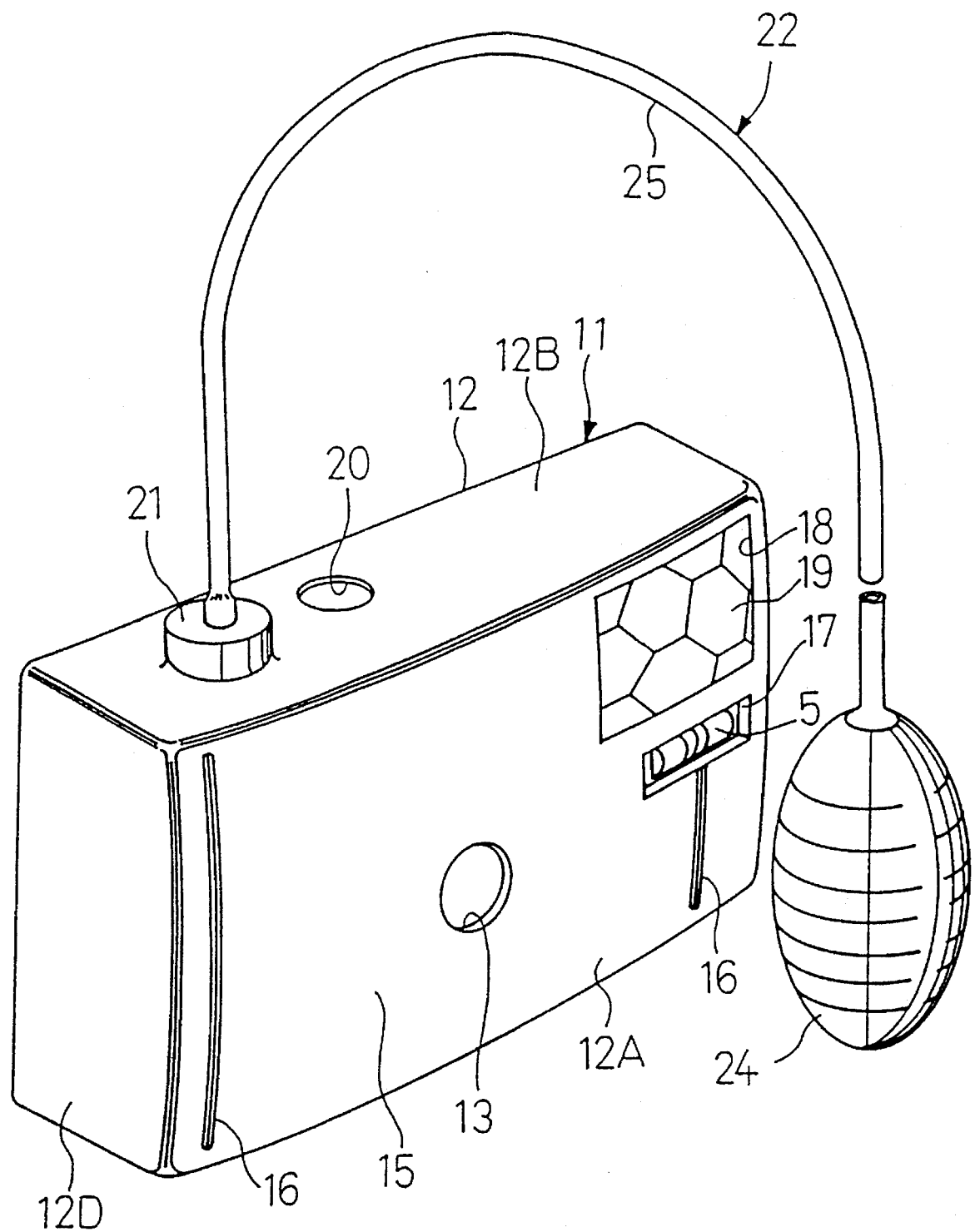
FIG. 1 shows a perspective view of a camera cover according to the first embodiment of the present invention.
Figure 2:
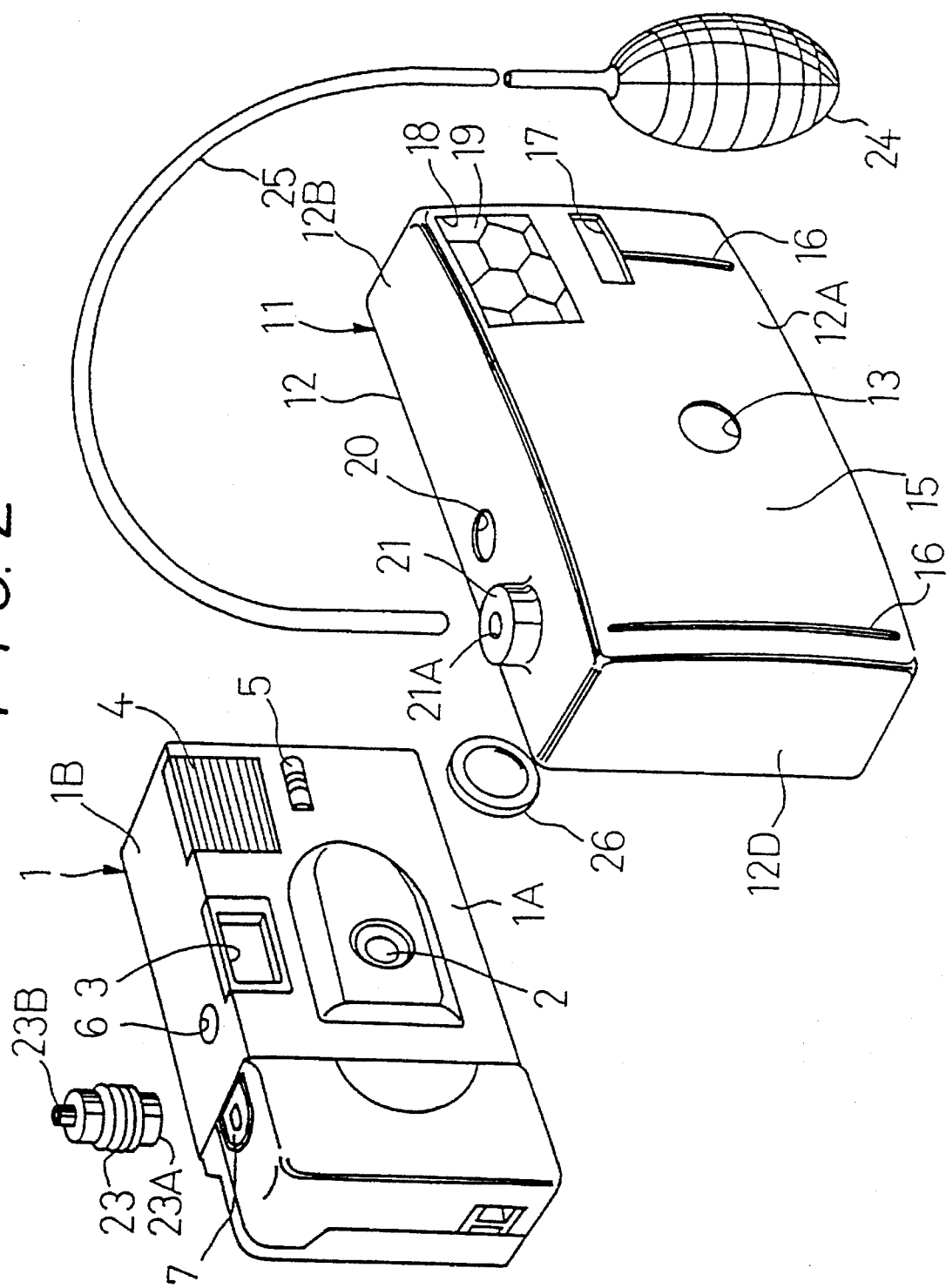
FIG. 2 shows a perspective view of the camera cover in a disassembled state and a film installed miniature camera.
Figure 3:
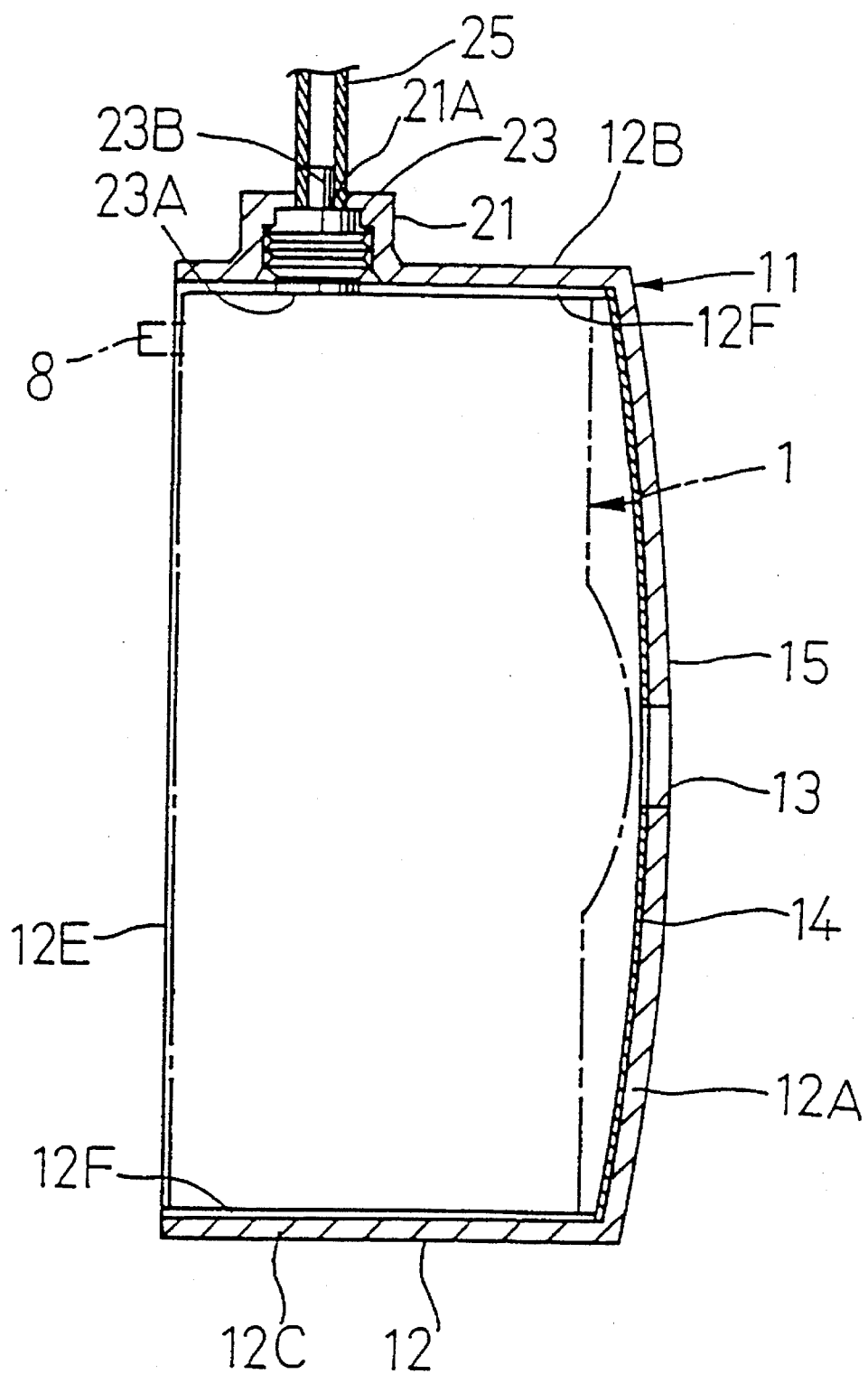
FIG. 3 shows a vertical cross-sectional view of the camera cover.

A camera cover for taking a self-portrait in accordance with the first embodiment of the invention is shown in FIGS. 1–3.

A commercially available film-installed miniature camera 1 (hereinafter referred to simply as a camera 1) includes, a lens 2, a finer aperture 3, a strobe 4 and a slide switch 5 for strobe on the front side 1A. The camera 1 also includes a film-counter window 6 and a shutter button 7 on the top 1B, and a finder window (not shown) and a film-winding knob 8 on the rear side 1C.

A camera cover 11 is removably attached to the camera 1, which comprises a transparent cover body 12 made of an acrylic or styrene plastic. The cover body 12 comprises a front 12A, a top 12B, a bottom 12C, side sections 12D and 12E, with the rear side opened. Inside the cover body 12, a plurality of ribs extend 12F from front to back of the cover body for retaining the camera 1.

The front surface 12A of the cover body 12 is convexly curved, and has an aperture 13 for transmitting light at the center thereof. The position of the aperture 13 corresponds to the lens 2 of the camera 1. The inner surface of the front portion 12A is coated with a reflective film 4, which is formed by, for example, aluminum evaporation, so that the overall front portion 12A structures a convex mirror 15.

A pair of reference lines 16 are monolithically formed on the front portion 12A for providing a reference frame showing a scope of picture when taking a photo. The reference lines 16 are actually ridges projecting on the front surface 12A. An opening 17 is formed on the front portion 12A for operating the strobe switch 5 of the camera.

Another opening 18 is formed on the front portion 12A at a position corresponding to the strobe 4 of the camera 1. A light diffusion plate 19 is fit into the opening 18 by adhering the periphery thereof. The light diffusion plate 19 is made of, for example, transparent plastic plate, on which uneven polygonal or waveform patterns are formed. This allows the strobe light to be defused in accordance with the plate patterns, thereby preventing halation which generally occurs when using strobe light at close range. By defusing the strobe light, soft and variegated photograph can be produced. If using a colored diffusion plated such as red, orange or blue, delicate color effect is further conferred to the resultant photographs.

On the top 12B of the cover body 12, an opening 20 is formed at a position corresponding to the film-counter window 1 of the camera 1 in order to make the film-counting visible. Also a hollow cylindrical protrusion 21 is nomolithically formed on the top 12B for accommodating a bellows 23. The bellows accommodator 21 has a hole 21A on its top, into which a tube 25 of the shutter release 22 is inserted.

The shutter release 22 in this embodiment is an air release and is used for remote control of the shutter button 7 of the camera 1. The shutter release 22 comprises the bellows 23 accommodated in the bellows accommodator 21, a rubber balloon 24 for supplying air to the bellows 23, and a plastic tube 25 connecting between the bellows 23 and the rubber balloon 24. As has been described, the bellows 23 is accommodated in the bellows accommodator 21, and it expands and pushes the shutter button 7 of the camera 1 with its bottom face 23A when air is supplied through the plastic tube 25. The plastic tube 25 has about 100 cm length and is connected to the bellows 23 via a tube connector 23B which is formed on the top face of the bellows 23. One end of the tube 25 is connected to the rubber balloon 24, and the other end is inserted into the hole 21A of the camera cover and connected to the tube connector 23B of the bellows 23.

Numeral 26 denotes a close-up attachment lens which can be detachably attached to the camera 1.

When taking a self-portrait, user attaches the camera cover 11 to the camera 1 and sets the camera with the cover on a desired place, for example, on the table. The user is away from the camera about 80–100 cm and is reflected himself or herself in the convex mirror 15 within the reference lines 16. The user can take a photo of himself or herself at any moment with any posing by operating the shutter release 22, while checking himself or herself reflected in the convex mirror 5.

When using the strobe 4, strobe light is defused by the light diffusion plate 19 and a soft and full-of-variety photograph is realized, which can not be achieved by the conventional camera.

Figure 4:
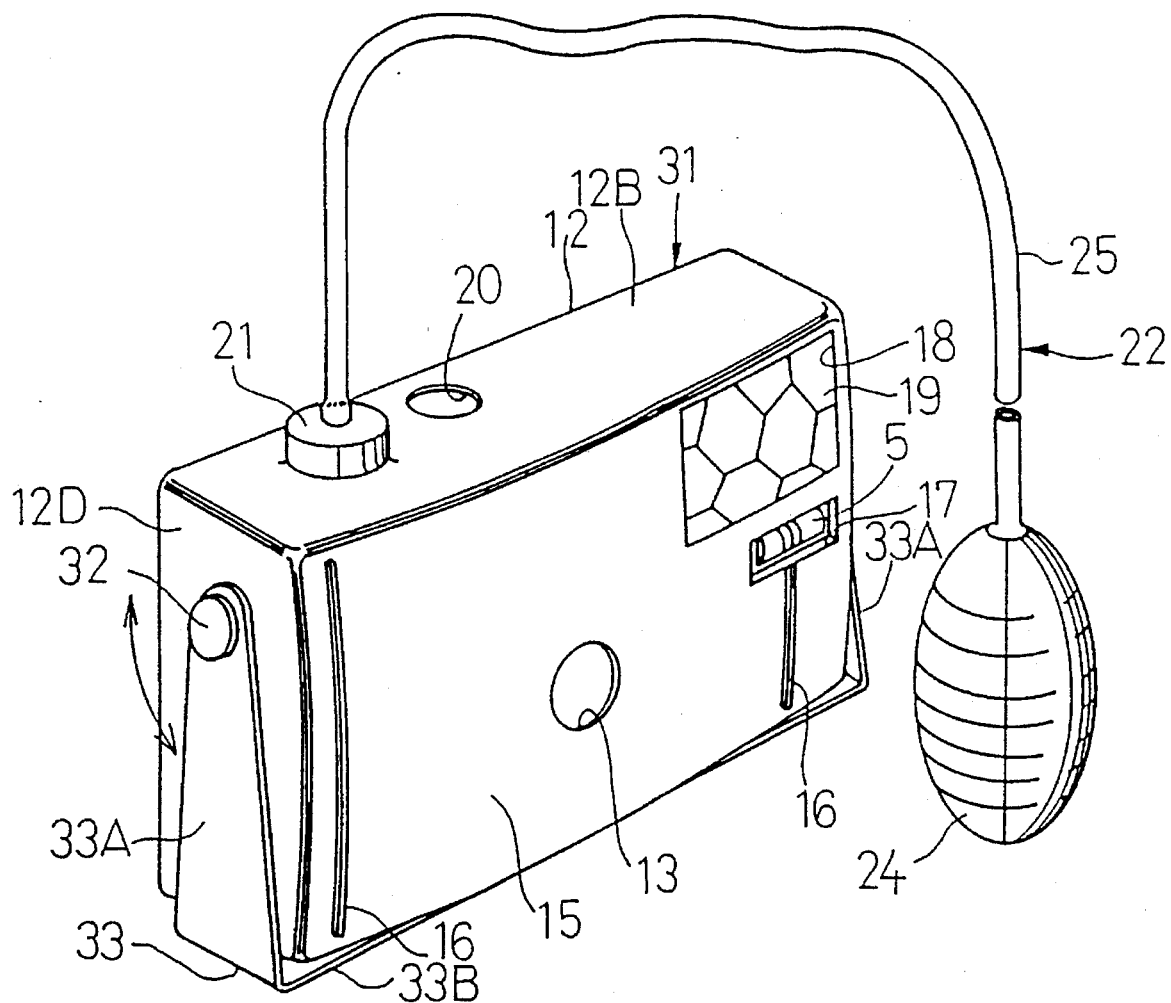
FIG. 4 shows a perspective view of a camera cover according to the second embodiment of the present invention.

FIG. 4 shows a camera cover 31 in accordance with the second embodiment of the invention. The feature of this camera cover 31 is a U-shaped support leg 33 comprising a pair of arms 33A and a wide leg portion 33B therebetween. The arms 33A and a leg portion 33B are monolithically formed. The arms 33A are attached to the either side of the cover body 12 (i.e. to the side faces 12D and 12E, respectively) by attachment shafts 32, thereby allowing the support leg 33 to be rotated around the camera cover 31. When rotating the support leg 33 upward, it can be used as a hunger handle.

The support leg 33 provides stability to the camera 1 so that the camera 1 can be set on unstable place, such as on the ground or grass. By rotating the cover body 12 while fixing the support leg 33 on an appropriate place, the camera 1 can be turned by any angle, e.g. upwardly slanting or facing right above.

Although the first and second embodiment have been described with an example of a film-installed miniature camera without a self-timer function and using a shutter release 22, the camera cover of the invention can be applicable to a so-called compact camera or instant camera. When applying the invention to a compact camera having a self-timer function, the shutter release 22 can be removed from the camera cover.

Although, in the embodiment, the air release 22 is used as a remote control shutter release means, an electromagnetic shutter release means may be used. The close-up lens 26 is used as needed, and instead, a special effect filter can be used.

The camera cover in accordance with the invention is fabricated as described below. The same elements are denoted as the same numerals so as to omit the explanation.

Figure 5:
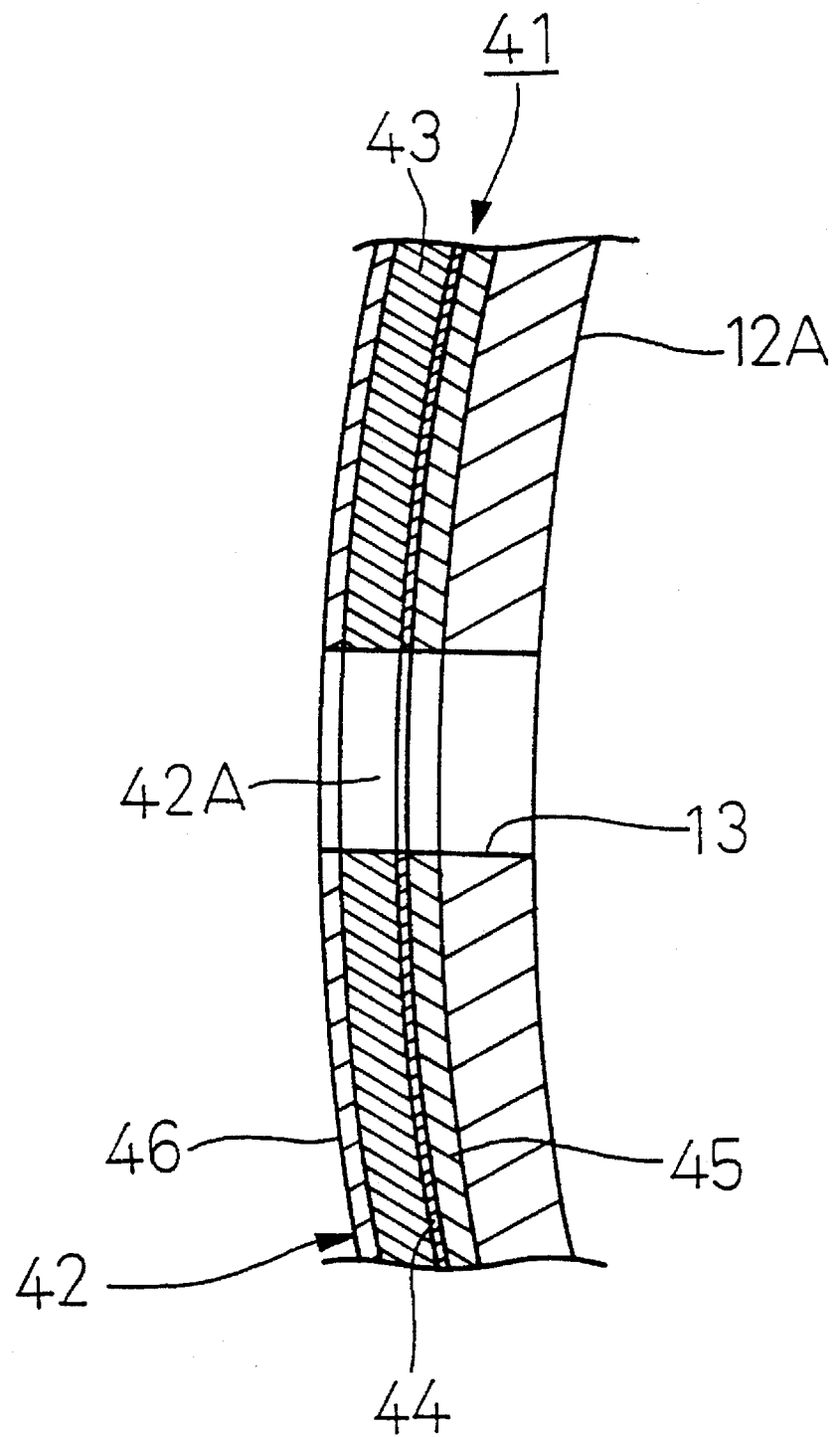
FIG. 5 shows a partial enlarged cross-sectional view of a camera cover according to an embodiment of the present invention.

FIG. 5 shows a cross-sectional view of a convex mirror 41 formed on the front portion 12A of the cover body 12. The convex mirror 41 is formed by cutting a mirror sheet 42 into a desired shape and attaching it onto the front portion 12A.

The mirror sheet 42 comprises a transparent film 43, a reflective film 44, an adhesive layer 45, and a protective film 46. The transparent film 43 is formed by shaping polyethylene terephthalate into a 0.12 mm of thickness. The transparent film 43 is backed with the reflective film 44 which is formed by aluminum evaporation. The reflective film 44 is further coated with an adhesive layer 45. The total thickness of the transparent film 43, reflective film 44 and adhesive layer 45 is about 0.18 to 0.20 mm. A protective film 46 having a thickness of about 10–20 micron is removably provided on the transparent film 43. The protective film is made of, for example, polyethylene.

The thus formed mirror sheet 42 is cut out in advance into a shape fitting to the front portion 12A of the cover body 12, and is punched by a die to form a hole 42A at a position corresponding to the light transmitting aperture 13. The mirror sheet 42 is adhered onto the front portion 12A of the cover body 12 via the adhesive layer 45, thereby constructing the front portion 12A as a convex mirror 41. The protective film 46 is provided for the purpose of protecting the surface of the transparent film 43, and is removed at an end of the manufacturing process of the camera cover 11.

As described above, a camera cover according to the present invention, which is removably attached to an existing camera, has a front portion having an aperture in a position corresponding to a lens of the camera and structuring a convex mirror. Therefore, the camera cover enables a photographer as a subject to take a picture of himself or herself and also enables a conventional camera to take a picture with an intended pose, expression, camera angle, by reflecting a subject on a convex mirror when taking a picture.

By equipping a shutter release means for remote control of a shutter of a camera, user can click the shutter while confirming a subject on the convex mirror to take a picture as intended.

A method of making a camera cover according to the present invention comprises the steps of:

preparing a camera cover body to be removably attached to a camera, the cover body having a front portion which covers at least a front side of a camera, the front portion being formed in a shape of a convex spherical surface and having an aperture in a position corresponding to a lens of the camera;

preparing a mirror sheet comprising a transparent film, a reflecting layer, an adhesive layer and a protective film;

cutting out the mirror sheet in a shape of the front portion; and affixing the cutout mirror sheet on the front portion by the adhesive layer.

Thus, the camera cover made by the method is light and portable, and can reduce a manufacturing cost as compared to forming a convex mirror by using a glass plate or synthetic resins plate. Further, large facilities are not required as compared to forming the mirror by evaporated aluminum on a cover body. Furthermore, a convex mirror having less distortion and superior reflection can be obtained. Since the thickness of the mirror sheet is only about 0.18–0.2 mm, the camera cover is safe when used. A minimum stocking space is required because the mirror sheet is very thin. The front surface of the transparent film is covered with a removable protective film. Therefore, there are many advantages such that the protective film can prevent the convex mirror form being harmed during the manufacturing process, and thus enabling higher yield rate of production.

What is claimed is:

1. A camera cover to be removably attached to a camera for taking a self-portrait comprising:

a front portion covering a front side of the camera, said front portion being formed in a shape of a convex spherical surface and having an aperture in a position corresponding to a lens of the camera;

peripheral portions each protruding from corresponding peripheral edges of said front portion and covering an upper side, a lower side, a left side and a right side of the camera, respectively, so that the camera fits therein;

wherein a whole surface of said front portion forms a convex mirror; and wherein said front portion is provided with reference lines for providing a reference frame showing a scope of picture when taking the self-portrait.

2. A camera cover for taking a self-portrait as recited in claim 1, wherein said camera cover is equipped with a shutter release means for remotely controlling a shutter of the camera.

3. A method of making a camera cover, comprising the steps of:

forming a camera cover body to be removably attached to the camera, said cover body having a front portion covering a front side of the camera and peripheral portions each protruding from corresponding peripheral edges of said front portion and covering an upper side, a lower side, a left side and a right side of the camera, respectively, so that the camera fits therein, said front portion being formed in a shape of a convex spherical surface and having an aperture in a position corresponding to a lens of said camera;

preparing a mirror sheet comprising a transparent film, a reflecting layer formed on a back surface of said transparent film by evaporation, an adhesive layer formed on said reflecting layer and a protective film removably formed on a front surface of said transparent film;

cutting out said mirror sheet into a shape of said front portion; and affixing said cutout mirror sheet on said front portion by said adhesive layer so as to form said front portion as a convex mirror.

* * * * *